(12) United States Patent
Moler

(10) Patent No.: US 6,924,586 B2
(45) Date of Patent: Aug. 2, 2005

(54) UNI-BODY PIEZOELECTRIC MOTOR

(75) Inventor: Jeff Moler, Sarasota, FL (US)

(73) Assignee: Viking Technologies, L.C., Sarasota, FL (US)

( * ) Notice: Subject to any disclaimer, the term of this patent is extended or adjusted under 35 U.S.C. 154(b) by 4 days.

(21) Appl. No.: 10/601,162

(22) Filed: Jun. 20, 2003

(65) Prior Publication Data

US 2004/0045148 A1 Mar. 11, 2004

Related U.S. Application Data

(60) Provisional application No. 60/390,620, filed on Jun. 21, 2002.

(51) Int. Cl.$^7$ ............................................. H01L 41/08
(52) U.S. Cl. ...................................................... 310/328
(58) Field of Search .................................. 310/328, 323, 310/348; H01L 41/08; H02N 2/00; H02K 41/08

(56) References Cited

U.S. PATENT DOCUMENTS

| | | | |
|---|---|---|---|
| 3,614,486 A | 10/1971 | Smiley | 310/8.2 |
| 3,666,975 A | 5/1972 | Balamuth | 310/8.2 |
| 3,902,084 A | 8/1975 | May, Jr. | 310/8.1 |
| 3,902,085 A | 8/1975 | Bizzigotti | 310/8.3 |
| 4,088,916 A | 5/1978 | Weineck et al. | 310/338 |
| 4,112,879 A | 9/1978 | Assenheimer et al. | 123/32 EA |
| 4,157,802 A | 6/1979 | May, Jr. | 248/346 |
| 4,208,636 A | 6/1980 | German | 331/94.5 P |
| 4,219,755 A * | 8/1980 | O'Neill et al. | 310/348 |
| 4,228,680 A | 10/1980 | Engel et al. | 73/119 A |
| 4,319,843 A | 3/1982 | Gornall | 356/346 |
| 4,336,809 A | 6/1982 | Clark | 128/665 |
| 4,388,908 A | 6/1983 | Babitzka et al. | 123/500 |
| 4,426,981 A | 1/1984 | Greiner et al. | 123/488 |
| 4,430,899 A | 2/1984 | Wessel | 73/754 |
| 4,432,228 A | 2/1984 | Kuschmierz et al. | 73/119 |
| 4,434,753 A | 3/1984 | Mukainakano et al. | 123/143 |
| 4,463,727 A | 8/1984 | Babitzka et al. | 123/458 |
| 4,468,583 A | 8/1984 | Mori | 310/328 |
| 4,479,475 A | 10/1984 | Babitzka | 123/446 |
| 4,570,095 A * | 2/1986 | Uchikawa | 310/328 |
| 4,570,096 A | 2/1986 | Hara et al. | 310/328 |
| 4,580,540 A | 4/1986 | Babitzka et al. | 123/458 |
| 4,617,952 A | 10/1986 | Fujiwara et al. | 137/85 |

(Continued)

FOREIGN PATENT DOCUMENTS

| | | | | |
|---|---|---|---|---|
| EP | 0325764 | | 8/1989 | |
| EP | 0 704 916 A1 | | 9/1995 | |
| JP | 6129681 | | 12/1986 | |
| JP | 01185175 | | 7/1989 | |
| JP | 5-305574 | | 11/1993 | |
| JP | 6-105568 | * | 4/1994 | ............ H02N/2/00 |
| WO | WO 98/23868 | | 6/1998 | |
| WO | WO 0178160 | | 10/2001 | |

*Primary Examiner*—Darren Schuberg
*Assistant Examiner*—Karen Beth Addison
(74) *Attorney, Agent, or Firm*—Young & Basile, P.C.

(57) ABSTRACT

An apparatus according to the present invention includes a support structure having a primary portion with first and second arm portions formed thereon for movement relative to one another, and a secondary portion with either a clamp portion or valve portion integrally formed on an outer end of each arm portion for movement therewith. A primary actuator is operably associated with the primary support structure for driving the arm portions relative to one another in response to an electrical activation of the primary actuator. Secondary actuators are operably associated with the secondary portions for independently driving the secondary portions between an opened position and a closed position in response to an electrical activation of each secondary actuator. Each of the actuators is operable independently of one another. The apparatus is operable to provide a bi-directional motor, a bi-directional pump, or a bi-directional compressor depending on the selected configuration and sequential mode of triggering the primary and secondary actuators.

31 Claims, 10 Drawing Sheets

U.S. PATENT DOCUMENTS

| | | | |
|---|---|---|---|
| 4,629,926 A | 12/1986 | Siegal | 310/331 |
| 4,660,523 A | 4/1987 | Brauer et al. | 123/458 |
| 4,667,639 A | 5/1987 | Linder et al. | 123/450 |
| 4,697,118 A | 9/1987 | Harnden, Jr. et al. | 310/331 |
| 4,714,855 A | 12/1987 | Fujimoto | 310/328 |
| 4,725,002 A | 2/1988 | Trachte | 239/102.2 |
| 4,735,185 A | 4/1988 | Imoto et al. | 123/498 |
| 4,736,131 A * | 4/1988 | Fujimoto | 310/328 |
| 4,749,897 A | 6/1988 | Natsume et al. | 310/317 |
| 4,750,706 A | 6/1988 | Schlagmüler | 251/129.06 |
| 4,757,223 A | 7/1988 | Ueyama | 310/82 |
| 4,777,398 A | 10/1988 | Shibuya | 310/328 |
| 4,793,313 A | 12/1988 | Paganon et al. | 123/506 |
| 4,808,874 A | 2/1989 | Stahlhuth | |
| 4,821,726 A | 4/1989 | Tamura et al. | 123/498 |
| 4,838,233 A | 6/1989 | Hayashi et al. | 123/506 |
| 4,874,979 A | 10/1989 | Rapp | 310/328 |
| 4,893,750 A | 1/1990 | Haworth et al. | 239/71 |
| 4,940,037 A | 7/1990 | Eckert | 123/506 |
| 4,947,077 A | 8/1990 | Murata | 310/328 |
| 5,009,142 A | 4/1991 | Kurtz | 84/454 |
| 5,027,027 A | 6/1991 | Orbach et al. | 310/317 |
| 5,034,647 A | 7/1991 | Ohtsuka | 310/328 |
| 5,040,514 A | 8/1991 | Kubach | 123/490 |
| 5,065,660 A | 11/1991 | de Buda | 84/200 |
| 5,080,079 A | 1/1992 | Yoshida et al. | 123/531 |
| 5,094,429 A | 3/1992 | Dostert | 251/129.06 |
| 5,109,885 A | 5/1992 | Tauscher | 137/554 |
| 5,157,256 A | 10/1992 | Aaron | 250/306 |
| 5,161,774 A | 11/1992 | Engelsdorf et al. | 251/11 |
| 5,182,484 A | 1/1993 | Culp | 310/328 |
| 5,199,641 A | 4/1993 | Hohm et al. | 239/102.2 |
| 5,237,238 A | 8/1993 | Berghaus et al. | 310/328 |
| 5,314,175 A | 5/1994 | Izumi et al. | 269/224 |
| 5,319,257 A | 6/1994 | McIntyre | 310/328 |
| 5,328,149 A | 7/1994 | Reuter | 251/129.06 |
| 5,332,942 A | 7/1994 | Rennex | 310/328 |
| 5,333,455 A | 8/1994 | Yoshioka | |
| 5,335,862 A | 8/1994 | Esper | 239/570 |
| 5,388,751 A | 2/1995 | Harada et al. | |
| 5,410,206 A | 4/1995 | Luecke et al. | 310/328 |
| 5,413,076 A | 5/1995 | Koenigswieser et al. | 123/446 |
| 5,425,343 A | 6/1995 | Akaki et al. | 123/490 |
| 5,435,477 A | 7/1995 | Torihata et al. | 228/4.5 |
| 5,460,202 A | 10/1995 | Hanley et al. | 137/627 |
| 5,465,021 A * | 11/1995 | Visscher et al. | 310/328 |
| 5,477,831 A | 12/1995 | Akaki et al. | 123/490 |
| 5,482,213 A | 1/1996 | Matsusaka et al. | 239/584 |
| 5,518,184 A | 5/1996 | Potz et al. | 239/533.4 |
| 5,645,226 A | 7/1997 | Bright | 239/585.1 |
| 5,685,485 A | 11/1997 | Mock et al. | 239/102.2 |
| 5,697,554 A | 12/1997 | Auwaerter et al. | 239/88 |
| 5,712,524 A | 1/1998 | Suga | 310/328 |
| 5,751,090 A | 5/1998 | Henderson | 310/328 |
| 5,779,149 A | 7/1998 | Hayes, Jr. | 239/124 |
| 5,780,956 A | 7/1998 | Oliver et al. | 310/323 |
| 5,780,957 A | 7/1998 | Oliver et al. | 310/328 |
| 5,803,370 A | 9/1998 | Heinz et al. | 239/533 |
| 5,810,255 A | 9/1998 | Itoh et al. | 239/102.2 |
| 5,831,264 A | 11/1998 | Shedd et al. | 250/306 |
| 5,847,387 A | 12/1998 | Shedd et al. | 250/306 |
| 5,875,764 A | 3/1999 | Kappel et al. | 123/467 |
| 5,881,767 A | 3/1999 | Löser | 137/599 |
| 5,901,896 A | 5/1999 | Gal | 228/4.5 |
| 5,907,212 A | 5/1999 | Okada | 310/328 |
| 5,907,269 A | 5/1999 | Zrostlik | 335/215 |
| 5,934,976 A | 8/1999 | Makino et al. | 451/28 |
| 5,975,428 A | 11/1999 | Potschin et al. | 239/88 |
| 6,016,040 A | 1/2000 | Hoffmann et al. | 318/116 |
| 6,021,760 A | 2/2000 | Boecking | 123/467 |
| 6,025,671 A | 2/2000 | Boecking | 310/369 |
| 6,035,722 A | 3/2000 | Giersch et al. | 73/714 |
| 6,040,643 A | 3/2000 | Bruns | 310/26 |
| 6,060,814 A | 5/2000 | Hoffmann et al. | 310/316.03 |
| 6,062,533 A | 5/2000 | Kappel et al. | 251/57 |
| 6,104,125 A | 8/2000 | Pan et al. | 310/328 |
| 6,131,879 A | 10/2000 | Kluge et al. | 251/129.06 |
| 6,437,226 B2 | 8/2002 | Oudshoorn et al. | |
| 6,548,938 B2 | 4/2003 | Moler et al. | |
| 6,642,067 B2 | 11/2003 | Dwyer | |
| 6,759,790 B1 | 7/2004 | Bugel et al. | |
| 2001/0003036 A1 | 6/2001 | Imai et al. | |

* cited by examiner

UNI-BODY PIEZOELECTRIC MOTOR

CROSS-REFERENCE TO RELATED APPLICATIONS

This application is a continuation of Provisional Patent Application Ser. No. 60/390,620 filed Jun. 21, 2002, which is incorporated by reference herein.

FIELD OF THE INVENTION

The present invention relates to a motor, a pump, or a compressor, with a single basic mechanical structure, a control sequence, and electromechanical actuators, for controlling movement and ancillary mechanical devices in a precise manner in multiple axis of movements, such that with the deliberate control of the ancillary mechanisms and the use of a precise stepping movement between these mechanisms, one can obtain the various basic types of mechanical work, with structural simplicity, and at a level of power never achievable before in a device of this type and size.

BACKGROUND OF THE INVENTION

The use of piezoelectric ceramics to provide continuos motion is well known. In other designs, such as the "Inch Worm" motor, for example, described in U.S. Pat. No. 4,847,979 issued Oct. 17, 1989, a mechanism is disclosed capable of some similar attributes most notability the ability to translate motion from a piezoelectric actuator to movement of an object. Also one might note that there is a required set of electrical steps to achieve this motion. The motion translated to the object is in direct proportion to the movement of the piezoelectric actuator. Since a piezoelectric stack actuator generally moves 0.0004" to 0.0012" it requires many electrical cycles to get movements of any sizeable amount. Some applications require various different relationships of speed, accuracy, and force beyond the above-described invention.

In another design such as "Ceramic Motor", for example, described in U.S. Pat. No. 6,064,140 issued May 16, 2000, a mechanism is disclosed with four actuators operating near or in resonant mode. The above system then again lacks the ability for the different relationships of speed, accuracy, and force to be met and has a limited scope of applications.

In another design, such as "Three Axis Control For Machine Tool", for example, described in U.S. Pat. No. 5,558,557 issued Sep. 24, 1996, a mechanism is disclosed with multiple actuators operating with a complex mechanical assembly in three axis to control a machine tool table to obtain a precise mechanical motion. This device requires many components, sensors, and complex control to obtain this function.

In another design, such as "E-Block Head Stack Microactuator Assembly", for example, described in U.S. Pat. No. 6,025,975 issued Feb. 15, 2000, a mechanism is disclosed with a single actuator operating a simple mechanical assembly in a single axis to control a transducing head of a disk drive to obtain a precise mechanical motion. This system has a simple structure; its movement is only in one axis.

In another design, such as "Hermetic Compressor For Refrigeration Systems", for example, described in U.S. Pat. No. 6,004,115 issued Dec. 21, 1999, a mechanism is disclosed with many actuators with the purpose of compressing a fluid. This system differs in that the piezoelectric actuators are directly in contact with the medium to be compressed or pumped and no provision was made for tolerance issues with the piezoelectric actuator.

In another design, such as "Linear Motor Driving Device", for example, described in U.S. Pat. No. 4,736,131 issued Apr. 5, 1988, a mechanism is disclosed with multiple actuators operating with arm assemblies in two axis to create a linear motion. Then again this system does not have a single base structure manufactured at the same time to reduce the tolerance stack up associated with multiple components as it relates to actuators with small movements.

SUMMARY OF THE INVENTION

The present invention provides a mechanism based on a single main structure, electromechanical actuators and electric control sequence which makes it possible to design efficient motors, pumps, and compressors without loss of energy associated with complex machines. The present invention provides a motor mechanism with a minimal number of components. As is known in the art of piezoelectric motors, alignment of all components in the motor can be challenging. The motor according to the present invention overcomes this issue by having a single main body containing the clamping surfaces, and a pushing mechanism machined at the same time thereby reducing tolerance stack-up issues.

The present invention discloses an apparatus including a support structure having a primary portion with first and second arms formed thereon for movement relative to one another, and a secondary portion integrally formed on an outer end of each arm for movement therewith, and a primary actuator operably associated with the primary portion of the support structure for driving the arms relative to one another in response to an electrical activation of the primary actuator, and secondary actuators operably associated with the secondary portion of the support structure for independently driving each of the secondary portions between an opened position and a closed position in response to an electrical activation of each secondary actuator, each of the actuators operable independently of one another. A force transfer member transmits a force from the primary actuator and to move the first and second arms with respect to one another. The apparatus can be used to operate a motor, a pump, or a compressor, with a single basic mechanical structure, control sequence, and electromechanical actuators, which makes it possible to control movement and ancillary mechanical devices in a precise manner in multiple axes of movement, such that with the deliberate control of the ancillary mechanisms and the use of a precise stepping movement between these mechanisms, the present invention can obtain the basic operation for many types of mechanical work, with structural simplicity, and a level of power never achievable before in a device of this type and size.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1A:
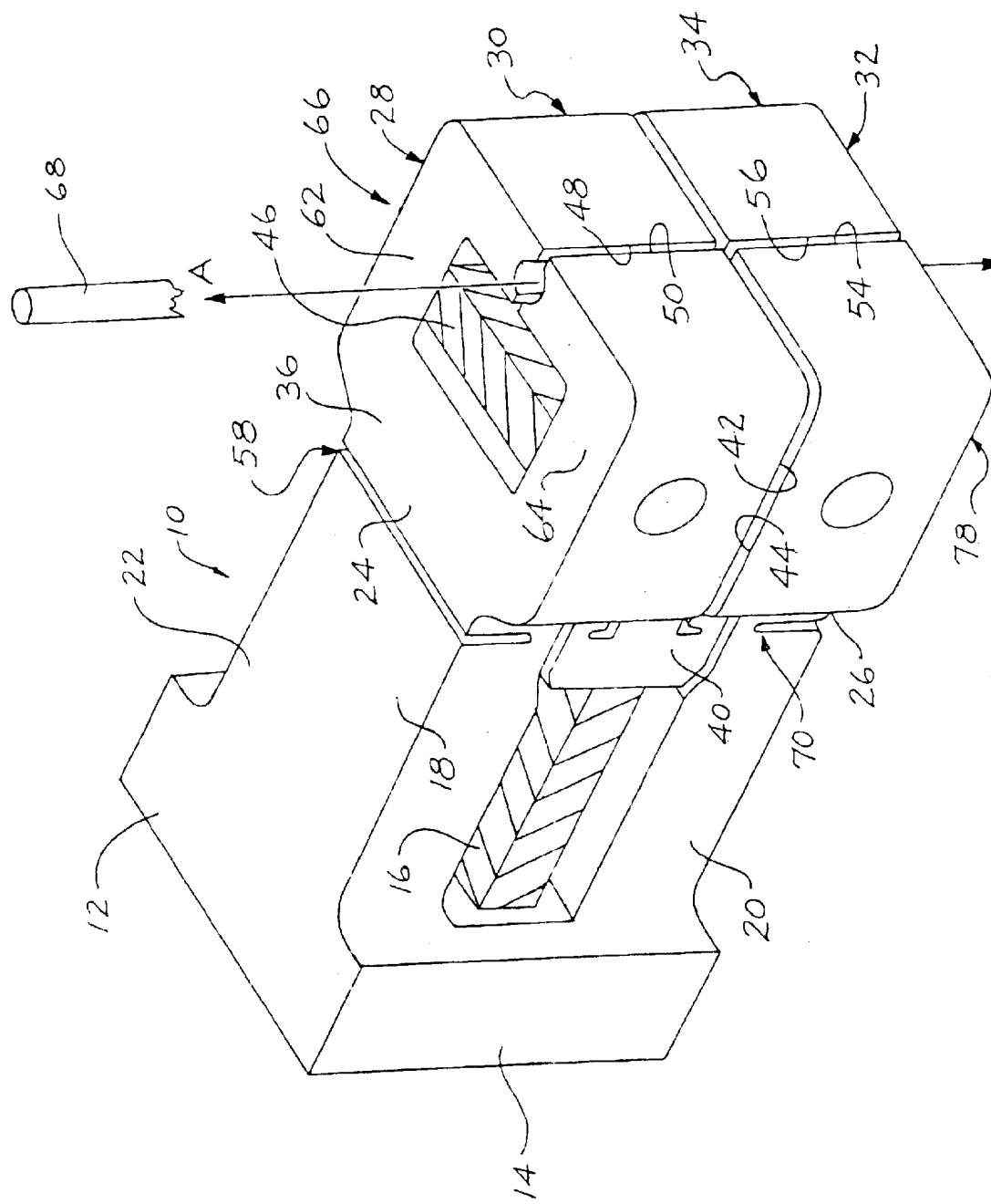
FIGS. 1A and 1B are perspective views of an apparatus according to the present invention from opposite sides.
Figure 1B:
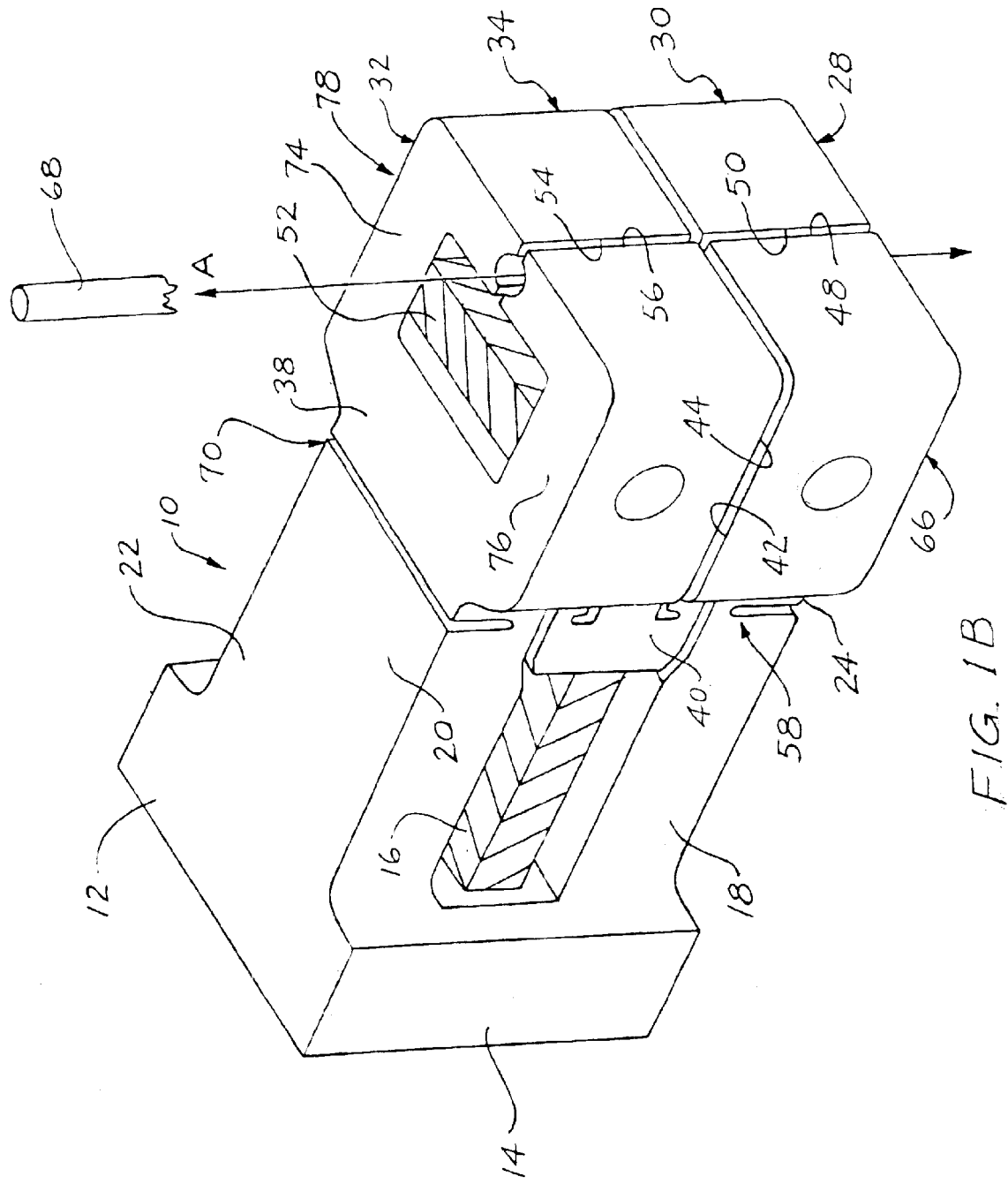

Referring now to FIGS. 1A and 1B, a linear motor 10 is depicted in accordance with the present invention showing both internal features and components of the motor. The linear motor 10 is shown in schematic illustration for descriptive purposes. The unitary, monolithic, single piece support structure 12 forms the basis for the motor. The support structure 12 includes a primary portion and a secondary portion. The support structure 12 includes a rigid primary web portion 14 for supportingly contacting one end of a primary piezoelectric actuator 16. The primary portion of the support structure 12 includes upper and lower primary side portions 18, 20, and primary web portion 14 to form part of a rigid C-shaped portion 22 of the support structure 12 for supporting upper and lower primary pivotable arm portions 24, 26. The secondary portion can include valve portions similar to those shown in FIGS. 5 and 6 or, first and second clamp portions 30, 34. The upper primary arm portion 24 supports a first secondary portion 28, such as an upper pivotable clamp portion 30, and the lower primary arm portion 26 supports a second secondary portion 32, such as a lower pivotable clamp portion 34. The primary pivotable arm portions 24, 26 can be of any desired length, or can be formed as the same structural component as the secondary web portions 36, 38 of each of the pivotable clamp portions 30, 34. A primary force transfer member portion 40 connects to the upper primary arm portion 24 near the junction with the upper primary side portion 18, and also connects to the lower primary arm portion 26 near the junction with the lower primary side portion 20 forming means for transferring movement from the force transfer member 40 to move the upper and lower pivotable clamps 30, 34 with respect to one another. The primary piezoelectric actuator 16 is captured and held in compression between the rigid primary web portion 14 and the primary force transfer member portion 40.

Upper clamp portion 30 includes two opposing surfaces 48, 50. When the appropriate electrical signal is applied to a secondary piezoelectric actuator 46, the secondary actuator 46 changes size or spatially displaces along a predetermined axis. The spatial change is proportional to the electrical voltage. In other words minimum voltage is equal to minimum spatial displacement, maximum voltage is equal to maximum spatial displacement, and proportional spatial displacement is achieved by varying the voltage between minimum and maximum. Therefore, when a maximum voltage is applied to secondary actuator 46, the opposing surfaces 48, 50 move to the maximum distance from each other. When the minimum voltage is applied to the secondary actuator 46, the opposing surfaces 48, 50 move to the minimum distance from each other in response to the "spring back" effect of the material forming the unitary, monolithic, single piece, support structure. When a variable voltage is applied to the secondary actuator 46, the two opposing surfaces 48, 50 move in a proportional manner with respect to one another.

Lower clamp portion 34 includes two opposing surfaces 54, 56 and a secondary piezoelectric actuator 52, operable independently of the secondary actuator 46. When the appropriate electrical signal is applied to the secondary piezoelectric actuator 52, the secondary actuator changes size or spatially displaces along a predetermined axis. The spatial change is proportional to the electrical voltage. In other words, minimum voltage is equal to minimum spatial displacement, maximum voltage is equal to maximum spatial displacement, and proportional spatial displacement is achieved by varying the voltage between minimum and maximum. Therefore, when a maximum voltage is applied to secondary piezoelectric actuator 52, the opposing surfaces 54, 56 move to the maximum distance from each other. When the minimum voltage is applied to the piezoelectric actuator 52, the opposing surfaces 54, 56 move to the minimum distance from each other in response to the "spring back" effect of the material forming the unitary, monolithic, single piece, support structure 12. When a variable voltage is applied to the piezoelectric actuator 52, the two opposing surfaces 54, 56 move in a proportional manner with respect to one another.

In a similar manner, the primary piezoelectric actuator 16 is captured between the primary web portion 14 and the primary force transfer member portion 40. Integrally connected to the primary force transfer member portion 40 of the support structure 12 is the upper clamp portion 30 via an integrally formed upper primary hinge portion 58, more specifically through hinge web 59 (shown in FIG. 2), and the lower clamp 34 via integrally formed lower primary hinge portion 70, more specifically through hinge web 71 (shown in FIG. 2). When the maximum voltage is applied to the primary piezoelectric actuator 16, the primary piezoelectric actuator changes size or spatially displaces along a predetermined axis. Primary web portion 14 along with upper and lower primary side portions 18, 20 define a C-shaped portion 22 of the support structure 12 that is of sufficient size and material strength to prevent any yielding or plastic deformation of the structure under expected design loads with infinite life for the support structure 12. Thus the force transferred to the primary force transfer member portion 40, causes the upper and lower pivotable clamp portions 30, 34 to move in an arc along axis 'A'. The distance between opposing faces 42, 44 of the upper and lower clamp portions 30, 34 changes to the maximum spatial displacement, when maximum voltage is applied to the primary actuator 16. When the minimum voltage is applied to primary piezoelectric actuator 16, the opposing faces 42, 44 of the upper and lower clamp portions 30, 34 move to the minimum spatial distance with respect to one another. When a variable voltage is applied to the primary piezoelectric actuator 16, the two opposing faces 42, 44 of the upper and lower clamp portions 30, 34 move in a proportional manner with respect to one another.

Figure 2:
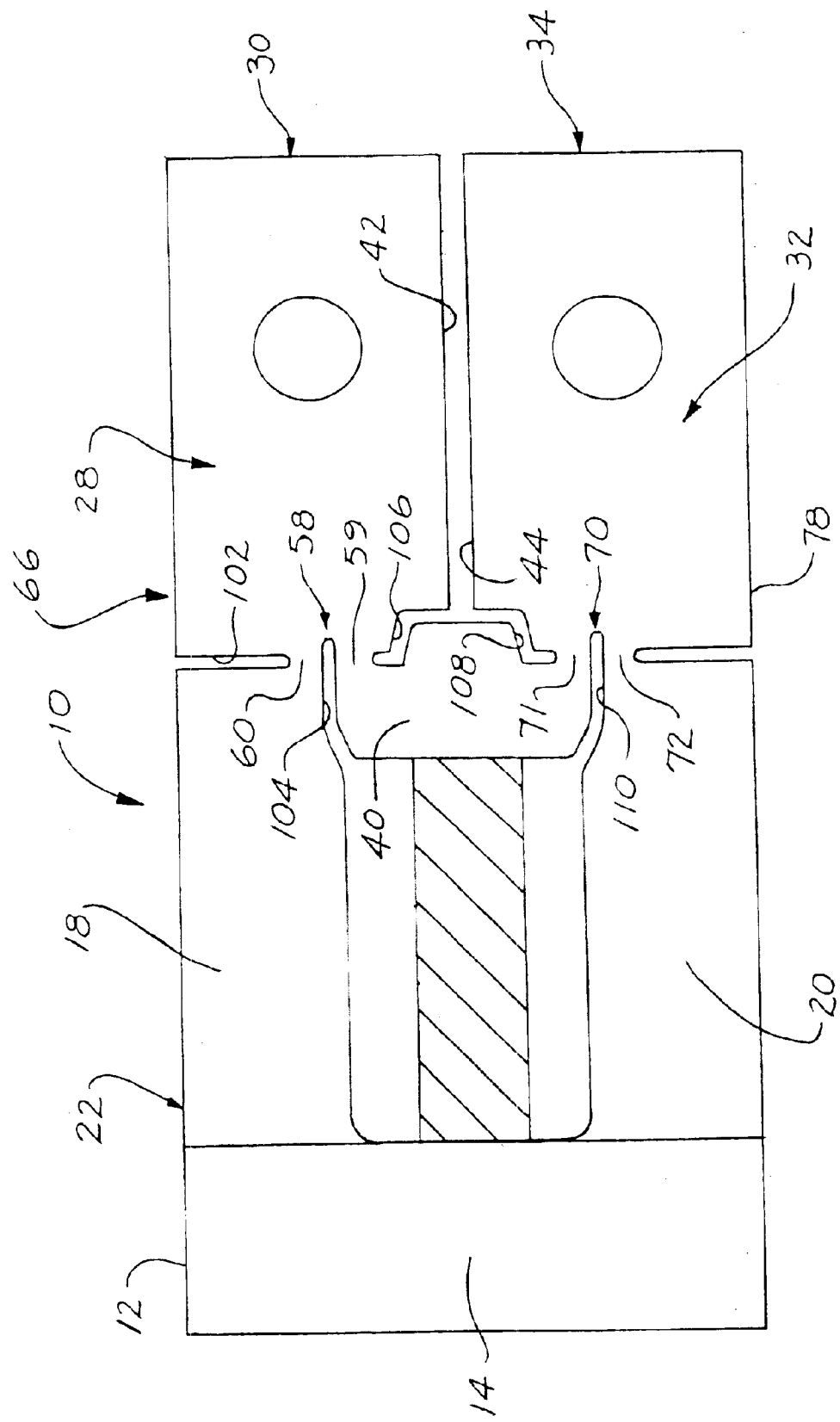
FIG. 2 is a side view of the apparatus of FIG. 1A.

FIG. 2 is a side view of the linear motor 10. The primary web portion 14 along with the upper primary side portion 18 and the lower primary side portion 20 form the basic C-shaped portion 22 of the support structure 12. Pivotable clamp portions 30, 34 combined with the C-shaped portion 22 of the support structure 12, the primary force transfer member portion 40, and integral hinge portions extending therebetween define the motor body 10. The primary piezoelectric actuator 16 is placed between one surface of the rigid primary web portion 14 and the primary force transfer member portion 40. The primary piezoelectric actuator 16 is captured between the primary web portion 14 and the primary force transfer member portion 40 of the support structure 12. When maximum voltage is applied to primary piezoelectric actuator 16, the primary piezoelectric actuator 16 changes size or spatially displaces along a predetermined axis. Rigid primary web portion 14 along with rigid upper and lower side portions 18, 20 define the C-shaped portion 22 of the overall support structure 12. The overall support structure 12 is of sufficient size and material strength to prevent any yielding or plastic deformation of the structure under the expected design loads with infinite life of the support structure 12. Thus the primary force transferred to the force transfer member portion 40, causes the two pivotable clamp portions 30, 34 to move with respect to one another. When the maximum voltage is applied to the primary piezoelectric actuator 16, the distance between opposing faces 42, 44 of the upper and lower clamp portions 30, 34 changes to the maximum spatial displacement with respect to one another. When the minimum voltage is applied to primary piezoelectric actuator 16, the opposing faces 42, 44 of the upper and lower clamp portions 30, 34 move to the minimum spatial distance with respect to one another. The spatial change of the primary actuator 16 is proportional to the electrical voltage applied, thus the distance between opposing faces 42, 44 of the upper and lower clamp portions 30, 34 is proportional.

Figure 3:
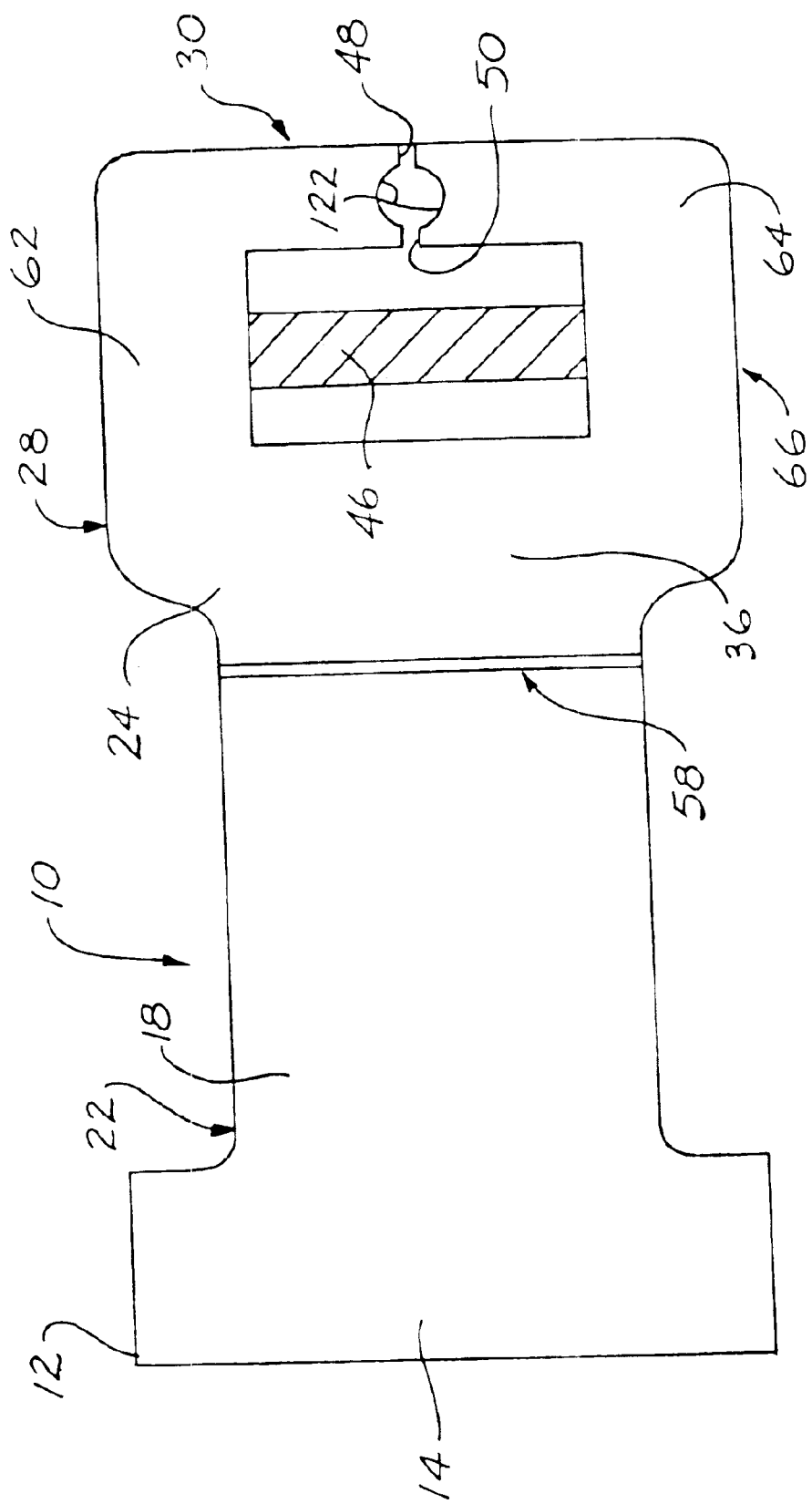
FIG. 3 is a top view of the apparatus of FIG. 1A.

FIG. 3 is a top view of the linear motor 10. The primary web portion 14 along with the primary upper side portion 18 form one half of the basic primary C-shaped portion 22 of the overall support structure 12. Integrally connected to the C-shaped portion 22 of the support structure 12, via an integrally formed upper primary portion hinge portion 58, and more specifically hinge web 60 (shown in FIG. 2), is the upper clamp portion 30. The upper clamp portion 30 includes a secondary web portion 36, a first secondary arm portion 62, a second secondary arm portion 64, and opposing clamping surfaces 48, 50 to define the upper secondary C-shaped portion 66 of the overall support structure 12 of the upper clamp portion 30. The upper clamp portion 30 is of sufficient size and material to prevent yielding or plastic deformation of the structure under expected design loads with infinite life of the first secondary portion 28, such as clamp portion 30.

When the secondary piezoelectric actuator 46 is energized, the opposing clamping surfaces 48, 50 move with respect to one another. Secondary piezoelectric actuator 46 is captured between the first secondary arm portion 62 and second secondary arm portion 64. The two opposing faces 48, 50 provide clamping surfaces. When secondary piezoelectric actuator 46 is energized, the secondary actuator 46 changes size or spatially displaces along a predetermined axis, and the force is transferred to the first secondary arm portion 62 and the second secondary arm portion 64 causing the secondary arms to move with respect to one another. When the maximum voltage is applied to the secondary piezoelectric actuator 46, the distance between opposing faces 48, 50 changes to the maximum spatial displacement with respect to one another. When the minimum voltage is applied to secondary piezoelectric actuator 46, the opposing faces 48, 50 move to the minimum spatial distance with respect to one another. The spatial change of the secondary actuator 46 is proportional to the electrical voltage applied, thus the distance between opposing faces 48, 50 are proportional with respect to one another. Using the spatial change in distance at opposing faces 48, 50, the present invention can provide a movable member 68, such as a reciprocal rod or a rotary disk, sized such that at minimum spatial displacement the movable member 68 is captured, and at maximum spatial displacement the movable member 68 is free. The movable member 68 can include threads or any other suitable grip enhancing surfaces.

Referring now to FIGS. 1A, 1B and 2, the primary web portion 14 along with lower primary side portion 20 form one half of the basic primary C-shaped portion 22 of the overall support structure 12. Integrally connected to the C-shaped portion 22 of the support structure 12, via an integrally formed lower primary hinge portion 70, and more specifically hinge web 72 is the lower clamp portion 34. The lower clamp portion 34 includes a secondary web portion 38, a first secondary arm portion 74, a second secondary arm portion 76, and opposing clamping surfaces 54, 56 to define the lower secondary C-shaped portion 78 of the overall support structure 12. The lower secondary C-shaped portion 78 is of sufficient size and material to prevent yielding or plastic deformation of the structure under expected design loads with infinite life for the clamp portion 34. When the secondary piezoelectric actuator 52 is energized, the opposing clamping surfaces 54, 56 move with respect to one another. Secondary piezoelectric actuator 52 is captured between the first secondary arm portion 74 and second secondary arm portion 76. The two opposing faces 54, 56 provide clamping surfaces. When secondary piezoelectric actuator 52 is energized, the secondary actuator 52 changes size or spatially displaces along a predetermined axis, and the force is transferred to the first secondary arm portion 74 and the second secondary arm portion 76 causing the secondary arms to move with respect to one another. When the maximum voltage is applied to the secondary piezoelectric actuator 52, the distance between opposing faces 54, 56 changes to the maximum spatial displacement with respect to one another. When the minimum voltage is applied to secondary piezoelectric actuator 52, the opposing faces 54, 56 move to the minimum spatial distance with respect to one another. The spatial change of the secondary actuator 52 is proportional to the electrical voltage applied, thus the distance between opposing faces 54, 56 are proportional with respect to one another. Using the spatial change in distance at opposing faces 54, 56, the present invention provides a movable member 68 sized such that at minimum spatial displacement the movable member 68 is captured, and at maximum spatial displacement the movable member is free. The movable member 68 can include a reciprocal rod or rotatable disk. The movable member 68 can also include threads or any other suitable grip enhancing surfaces.

Figure 4A:
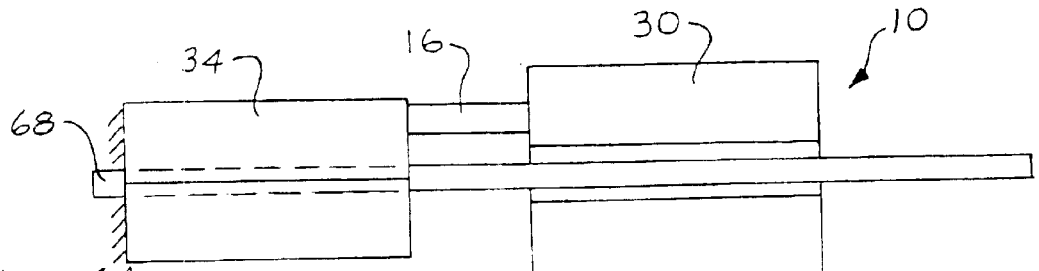
FIGS. 4A–4E are simplified schematic diagrams illustrating five steps per cycle movement for the apparatus according to the present invention illustrated in FIGS. 1A–3.
Figure 4B:
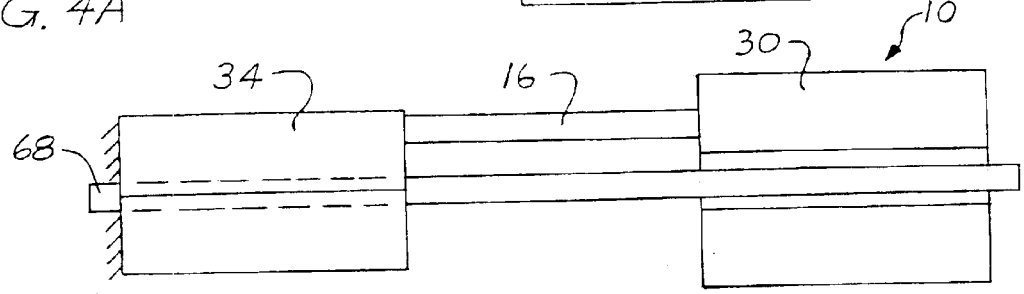
Figure 4C:
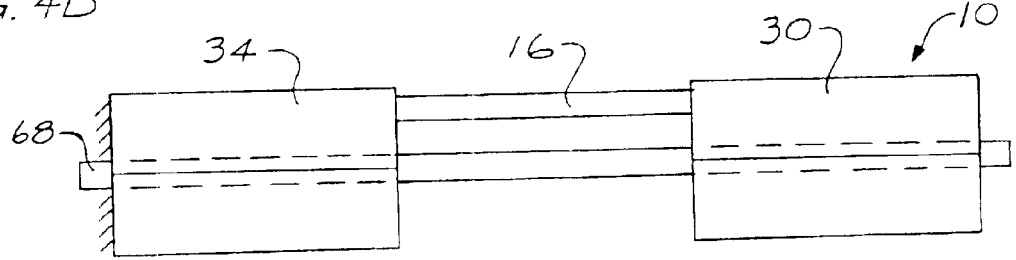
Figure 4D:
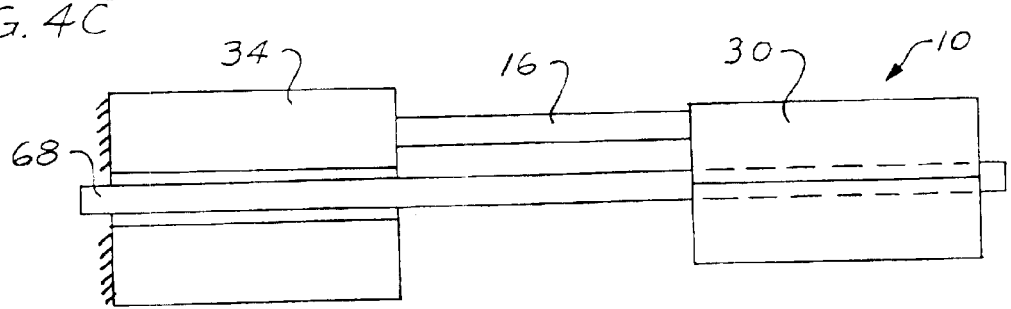
Figure 4E:
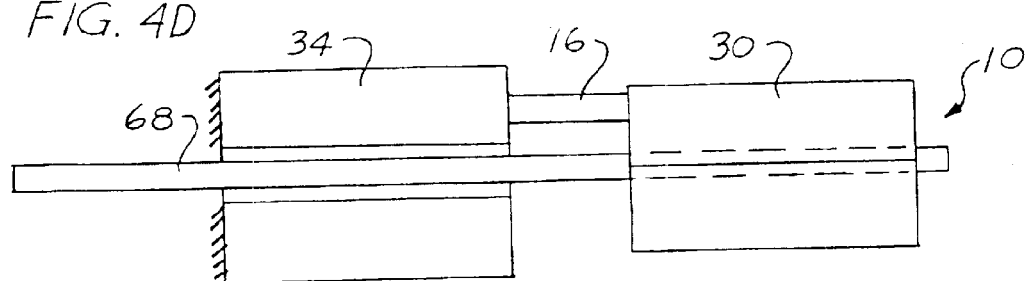

FIGS. 4A–4E depict a simplified schematic sequence of steps required for movement of the uni-body motor according to the present invention as illustrated in FIGS. 1A–3. FIG. 4A illustrates the motor 10 in a first position. When in the first position, clamp portion 30 is open with secondary actuator energized 46, while fixed clamp portion 34 is closed with secondary actuator 52 de-energized, and the primary actuator 16 de-energized. It should be noted that clamp portion 34 is fixed or used as a reference point. FIG. 4B illustrates the motor 10 in a second position. When in the second position, clamp portion 30 is open with secondary actuator 46 energized, while fixed clamp portion 34 is closed with secondary actuator 52 de-energized, and primary actuator 16 energized to spatially displace clamp portion 30 in reference to fixed clamp portion 34. FIG. 4C illustrates the motor 10 in a third position. When in the third position, clamp portion 30 is closed with secondary actuator 46 de-energized, while fixed clamp portion 34 is closed with secondary actuator 52 de-energized, and primary actuator 16 energized so that clamp portion 30 remains spatially displaced in reference to fixed clamp portion 34. FIG. 4D illustrates the motor 10 in a fourth position. When in the fourth position, clamp portion 30 is closed with secondary actuator 46 de-energized, while fixed clamp portion 34 is open with secondary actuator 52 energized, and primary actuator 16 energized so that clamp portion 30 remains spatially displaced in reference to fixed clamp portion 34. FIG. 4E illustrates the motor 10 in a fifth position. When in the fifth position, clamp portion 30 is closed with secondary actuator 46 de-energized, while fixed clamp portion 34 is open with secondary actuator 52 energized, and primary actuator 16 de-energized so that clamp portion 30 is no longer spatially displaced in reference to fixed clamp portion 34. During this step, since clamp portion 30 was closed with secondary actuator 46 de-energized, and the primary actuator 16 was de-energized, the movable member 68 held in clamp portion 30 is moved toward the fixed clamp portion 34.

The motor is capable of performing the 5-step sequence many times a second. Therefore, substantial and rapid motion of the movable member 68 can be achieved. In a particular embodiment of the present invention, a single cycle of the 5-steps will provide maximum movement of the movable member 68 of approximately 0.010 inches. Thus, for example, at an operating speed of 100 cycles per second, the movable member can achieve a speed of approximately 1 inch per second. In practice, the maximum movement or displacement is determined by multiple factors. These factors include: 1) the operating frequency; 2) the percent of maximum voltage applied to the primary actuator 16; 3) the "sizes" of component portions of a particular embodiment of the invention; and 4) the load on the movable member. It can be seen by those skilled in the art that the invention described herein can be embodied in a variety of "sizes". Further, the "sizes" of the individual components, such as, for example, the primary actuator 16, can be varied within a particular "size" of the overall embodiment. As with any mechanical system such as a motor, if a load is applied that exceeds the force that the system is capable of supplying, the system will stall or cease to move. In the present invention, as with many other mechanical systems, as the load approaches the maximum system force, the speed can decrease. However, the present invention does not have a specific force limitation. Again, the "size" of the overall embodiment or the individual components, such as, for example, the primary actuator 16, can be varied to obtain a wide range of operating forces.

It should be noted that the motion created by a single step is greater than the maximum spatial displacement of the piezoelectric actuator and that the hinge arrangement of the motor structure 10 acts as both a hinge and mechanical amplifier. The 5-step sequence may be repeated or cycled two or more times to generate larger movements. Likewise, the present invention when operated as a motor, pump, or compressor does not have to apply full excitation voltage to the primary actuator 16 resulting in full spatial displacement, the present invention can control the size of the step by reducing the excitation voltage to the primary actuator 16 in order to take advantage of the proportional nature of piezoelectric actuators. In this way, for example, the present invention can operate in either a fixed displacement or a variable displacement mode. Further, by varying the speed of the control steps, the operating speed of the particular embodiment of the present invention can vary. Further still, both the displacement amount and the speed can be varied dynamically. That is to say, the amount of displacement and the speed of displacement can be changed at effectively any time during operation.

The sequence of operations performed for movement can be modified to create motion in the other direction, by energizing the primary actuator 16 while movable clamp 30 is closed and fixed clamp 34 is open, and by de-energizing the primary actuator 16 while movable clamp 30 is open and fixed clamp 34 is closed.

Figure 5A:
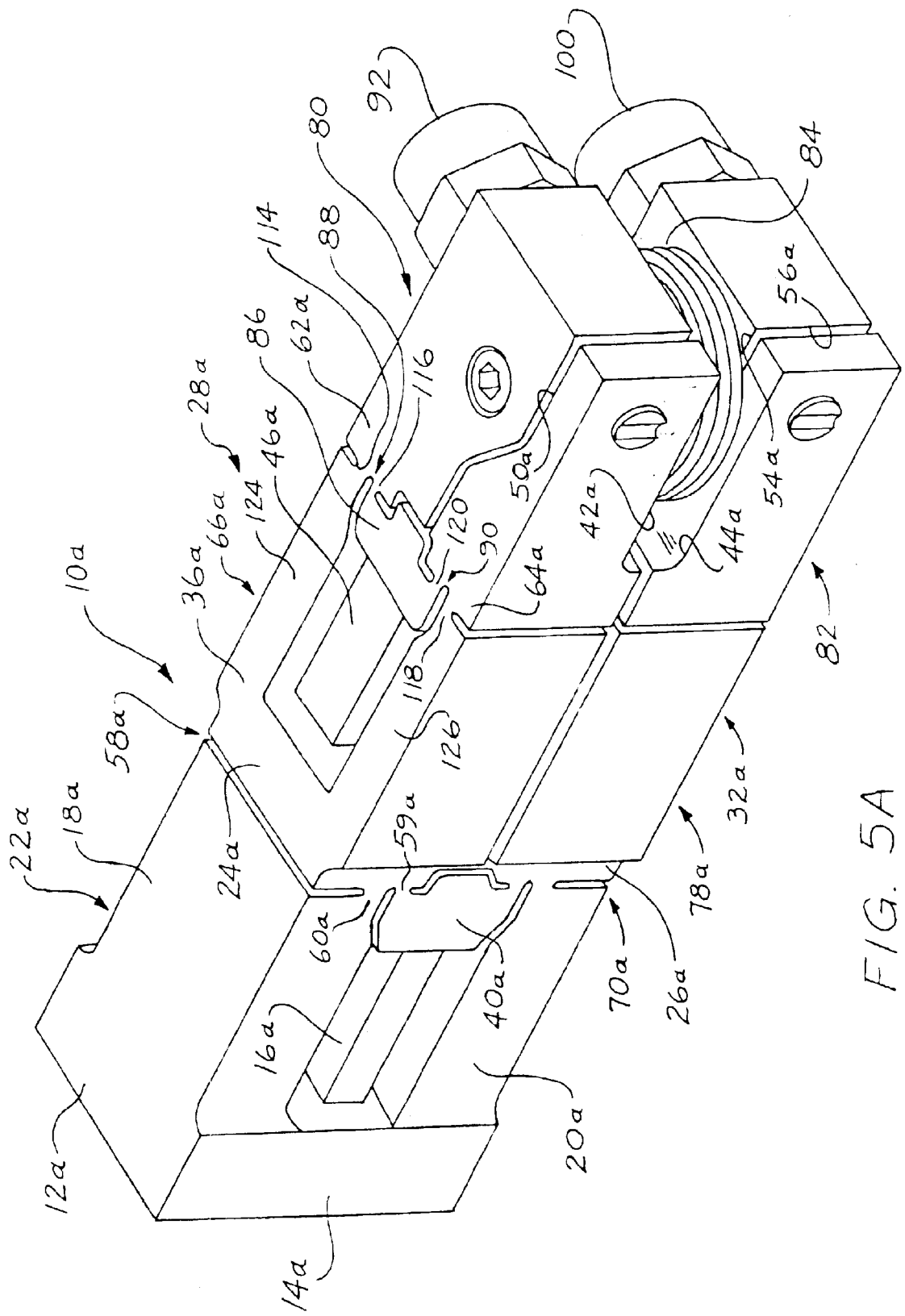
FIGS. 5A and 5B are perspective views of an alternate embodiment of the apparatus according to the present invention from opposite sides.
Figure 5B:
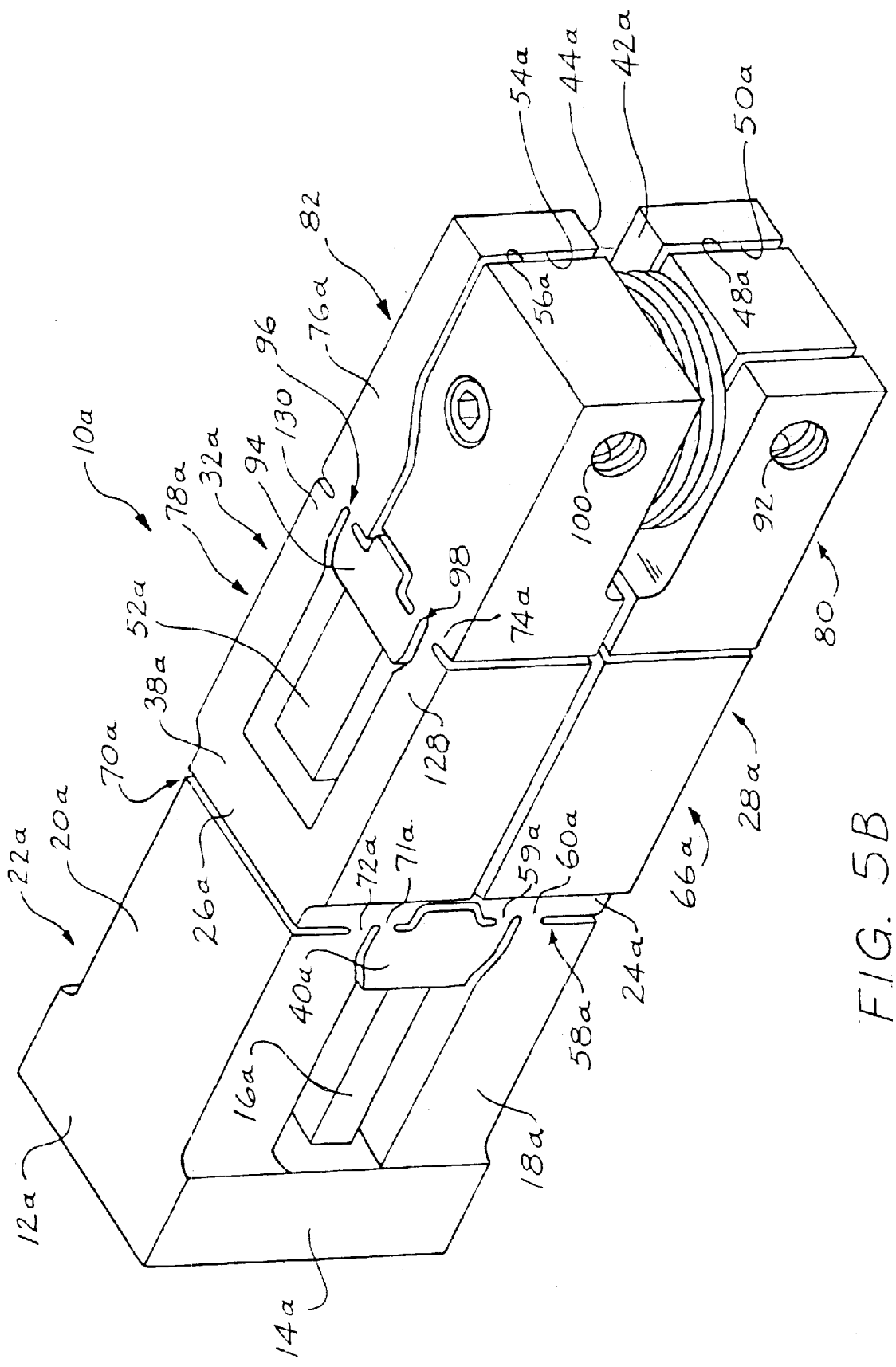
Figure 6:
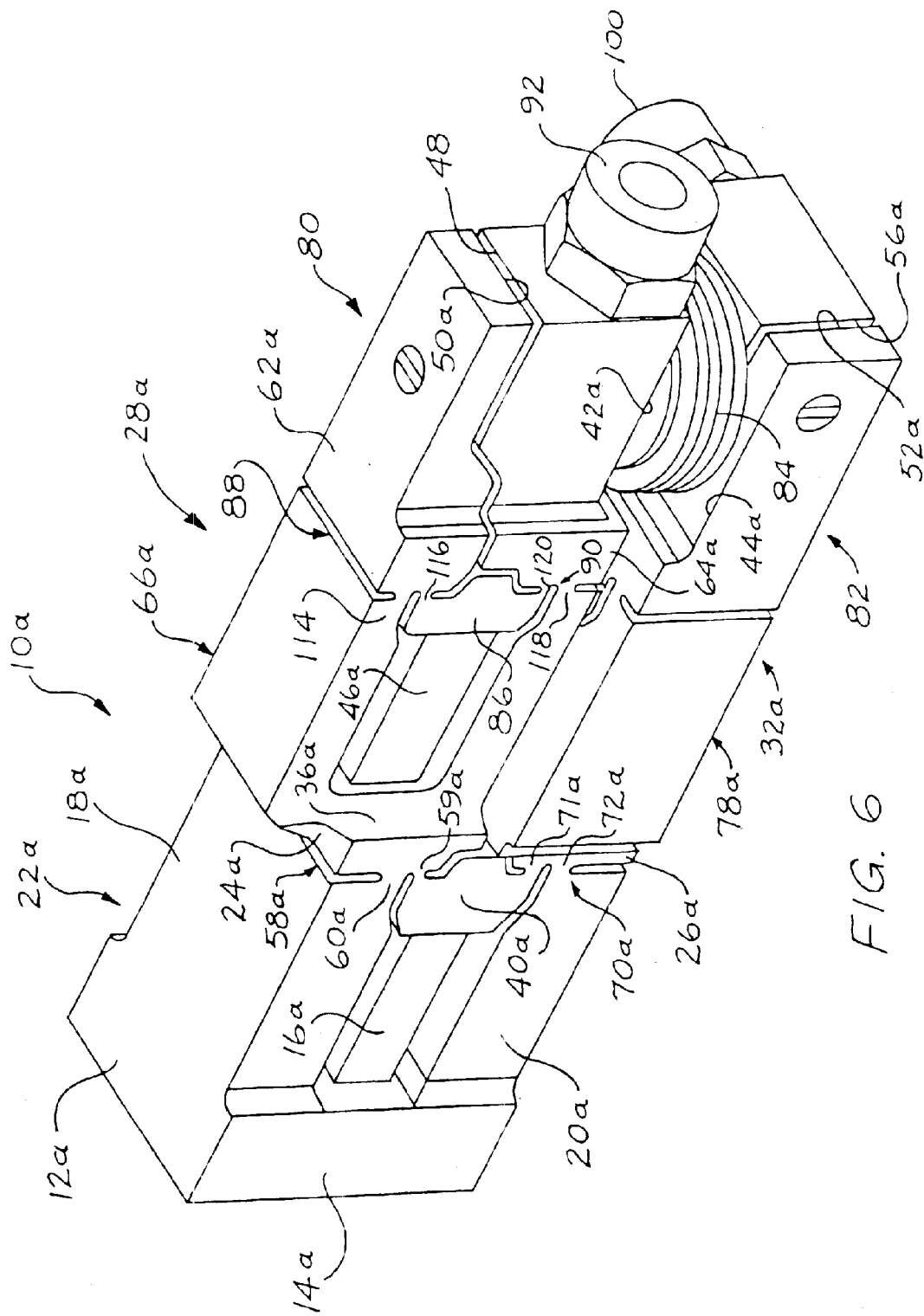
FIG. 6 is an alternate configuration of the embodiment of the present invention illustrated in FIGS. 5A and 5B.

FIGS. 5A and 5B depict a compressor or pump 10a in accordance with the present invention showing both external features and components of the compressor or pump. The compressor or pump 10a is shown in schematic illustration for descriptive purposes. The particular embodiment illustrated in FIGS. 5A, 5B and also in FIG. 6 is depicts a bellows method of pumping or compression. It should be understood by those skilled in the art that the present invention applies to a wide variety of pump/compressor methods, including without limitation to positive displacement and variable displacement pump/compressor capabilities. For example, in place of the illustrated bellows, a piston or a diaphragm could be employed. The preceding examples are not meant to define the limits of the present invention regarding pumps and compressors but only to indicate that a wide range of pump techniques can be implemented using the present invention.

The unitary, monolithic, single piece support structure 12a forms the basis for the compressor or pump. The support structure 12a includes a primary portion and a secondary portion. The support structure 12a includes a rigid primary web portion 14a for supportingly contacting one face of a primary piezoelectric actuator 16a. The upper primary side portion 18a supports a first secondary portion 28a, such as an upper pivotable valve portion 80 and the lower side portion 20a supports a second secondary portion 32a, such as a lower pivotable valve portion 82. Upper and lower primary side portions 18a, 20a in conjunction with primary web portion 14a form a rigid C-shaped portion 22 of the overall support structure 12a for supporting upper and lower primary pivotable arm portions 24a, 26a. The primary pivotable arm portions 24a, 26a can be of any desired length, or can be the same structural component as the secondary web portions 36a, 38a (best seen in FIG. 6) of each of the upper and lower valve portions 80, 82. A primary force transfer member portion 40a connects through integrally formed hinge portions 58a and more specifically hinge web 59a to the secondary arm portion 24a near the junction with the upper side portion 18a and also connects through integrally formed hinge portion 70a and more specifically hinge web 71a to the secondary arm portion 26a near the junction with the lower side portion 20a. The integrally formed hinge portions 58a, 70a define means for transferring movement from the primary force transfer member portion 40a through hinge webs 59a, 71a to the primary movable arm portions 24a, 26a, supporting upper and lower pivotable valve portions 80, 82 for pivoting movement about hinge webs 60a, 72a.

The primary piezoelectric actuator 16a is captured and held in compression between the rigid primary web portion 14a and the primary force transfer member portion 40a. When the appropriate electrical signal is applied to the primary piezoelectric actuator 16a held between surfaces associated with primary web portion 14a, and primary force transfer member portion 40a, the primary actuator 16a changes size or spatially displaces along a predetermined axis. The spatial change is proportional to the electrical voltage. In other words, minimum voltage is equal to minimum spatial displacement, maximum voltage is equal to maximum spatial displacement, and proportional spatial displacement is achieved by varying the voltage between minimum and maximum. Therefore, when a maximum voltage is applied to the primary actuator 16a, the opposing faces 42a, 44a of upper and lower valve portions 80, 82 move to the maximum distance from each other. When the minimum voltage is applied to the primary actuator 16a, the opposing faces 42a, 44a of the upper and lower valve portions 80, 82 move to the minimum distance from each other. When a variable voltage is applied to the primary actuator 16a, the two opposing faces 42a, 44a of the upper and lower valve portions 80, 82 move in a proportional manner with respect to one another.

A pump means 84 is placed between opposing faces 42a, 44a and can be expanded or compressed by an application of voltage to the primary piezoelectric actuator 16a. Upper valve portion 80 includes two opposing faces 54a, 56a, a secondary piezoelectric actuator 46a, and a secondary force transfer member portion 86 with integral hinge portions 88, 90 to provide mechanical amplification. When the appropriate electrical signal is applied to the secondary piezoelectric actuator 46a in the upper valve portion 80 of the overall support structure 12a, the secondary actuator 46a changes size or spatially displaces along a predetermined axis. The spatial change is proportional to the electrical voltage. In other words, minimum voltage is equal to minimum spatial displacement, maximum voltage is equal to maximum spatial displacement, and proportional spatial displacement is achieved by varying the voltage between the minimum and maximum values. Therefore, when a maximum voltage is applied to secondary actuator 46a, the opposing faces 54a, 56a move to the maximum distance from each other. Internally, a standard pneumatic type 2-way valve resides within the upper valve portion 80 between a fitting 92 and the pump means 84. The 2-way valve can be opened and closed by an application of voltage to secondary piezoelectric actuator 46a.

Lower valve portion 82 includes two opposing faces 54a, 56a, a secondary piezoelectric actuator 52a, and a secondary force transfer member portion 94 with integral hinge portions 96, 98 to provide mechanical amplification. When the appropriate electrical signal is applied to the secondary piezoelectric actuator 52a in the lower valve portion 82 of the overall support structure 12a, the secondary actuator 52a changes size or spatially displaces along a predetermined axis. The spatial change is proportional to the electrical voltage. In other words, minimum voltage is equal to minimum spatial displacement, maximum voltage is equal to maximum spatial displacement, and proportional spatial displacement is achieved by varying the voltage between minimum and maximum values. Therefore, when a maximum voltage is applied to secondary actuator 52a, the opposing faces 54a, 56a move to the maximum distance from each other. Internally, a standard pneumatic type 2-way valve resides within the lower valve portion 82 between a fitting 100 and the pump means 84. The 2-way valve can be opened and closed by an application of voltage to secondary piezoelectric actuator 52a.

Similar to FIGS. 4A–4E, a sequence of steps can be constructed to result in a pumping action. Given that the pump uses a programmable valve structure, the direction of flow will be dependent on the sequence of steps between the upper and lower valve portions 80, 82 and pump means 84. Therefore, the pump according to the present invention is considered to be bi-directional.

FIG. 6 depicts an alternate configuration for the basic structure shown in FIGS. 5A and 5B. All components and features are the same as described for FIGS. 5A and 5B with the exception that the first secondary portion 28b, such as upper valve portion 80 of the overall support structure 12a has been rotated to be actuated along an axis extending generally perpendicular with respect to an axis of actuation of the second secondary portion 32a, such as lower valve portion 82. This configuration should be compared with the axes of actuation being disposed generally parallel with respect to one another as illustrated in FIGS. 5A and 5B. It should be recognized that the present invention also includes the configuration where both the secondary portions, 28b, 32a, such as upper and lower valve portions 80, 82 are rotated from the orientation as illustrated in FIGS. 5A and 5B to an orientation similar to that as illustrated with respect to valve portion 80 in FIG. 6, so that both valve portions 80, 82 are disposed to be actuated along a generally common axis of actuation.

Referring again to FIGS. 1A–3, an apparatus 10, such as for use as a motor, pump, or compressor, is illustrated. The apparatus includes a unitary, monolithic, single piece support structure 12. The support structure 12 includes a primary portion and a secondary portion. The primary portion of the support structure 12 includes a rigid non-flexing primary web portion 14 and rigid non-flexing primary side portions 18, 20. The rigid side portions 18, 20 through integrally formed hinge portions 58, 70 and more specifically through hinge webs 60, 72 pivotally support primary pivotable arm portions 24, 26. The support structure includes secondary portions 28, 32, such as pivotable clamp portions 30, 34 integrally connected with the primary web portion 14. The first and second primary side portions 18, 20 extend between and are integrally connected with the primary web portion 14 and the clamp portions 30, 34. Opposing faces 48, 50 and 54, 56 are formed on the corresponding first and second clamps portions 30, 34. A primary force transfer member portion 40 transmits force from a primary actuator 16 to the primary arm portions 24, 26 supporting the first and second clamps portions 30, 34 through primary hinge portions 58, 70 and more specifically hinge webs 59, 71. The primary actuator 16 is capable of moving the primary arm portions 24, 26 supporting the first and second clamp portions 30, 34 between first and second positions with respect to one another. In the illustrated embodiment, the opposing faces 42, 44 move away from one another to the second position as the primary actuator 16 expands during excitation, and the opposing faces 42, 44 move toward one another to the first position as the primary actuator 16 retracts in the absence of excitation. The primary actuator 16 can be operated with an appropriate amount of excitation to achieve any position between the fully expanded and the fully retracted positions.

Each of the secondary portions 28, 32, such as first and second clamp portions 30, 34, include secondary pivotable arm portions 62, 64 and 74, 76 extending from corresponding secondary web portions 36, 38 respectively. If desired, the secondary arm portions can be formed as a pair of a pair of substantially L-shaped arms. Opposing surfaces 48, 50 and 54, 56 are formed on the ends of the corresponding secondary arm portions 62, 64 and 74, 76. Secondary actuators 46, 52 are operably engaged with the secondary portions 28, 32, such as between the corresponding first and second arm portions 62, 64 and 74, 76 of the first and second clamp portions 30, 34 respectively as illustrated in FIGS. 1A–3. The secondary actuators 46, 52 are capable of moving the secondary arm portions 62, 64 and 74, 76 and associated opposing surfaces 48, 50 and 54, 56 with respect to one another when energized.

Referring now to FIG. 2, the support structure 12 includes integrally formed primary hinge portions 58 and 70. Primary hinge portion 58 is formed by adjacent hinge webs 60, 59, and primary hinge portion 70 is formed by adjacent hinge webs 72, 71 respectively. Primary hinge portions 58 and 70 are operably connected with the primary side portions 18, 20, primary pivotable arm portions 24, 26, and the primary force transfer member portion 40. The adjacent hinge webs 60, 59 are located in close proximity to one another and generally extend parallel to one another. The adjacent hinge webs 71, 72 are also located in close proximity to one another and generally extend parallel to one another. By way of example and not limitation, as illustrated in FIGS. 1A–3, the integral hinge portions 58 and 70 are formed by reduced cross-sectional areas created in the support structure 12 with slots 102, 104, 106, 108, 110, and 112 (shown in FIG. 2). The slots 102, 104, 106, 108, 110, and 112 define the substantially parallel hinge portions 58, 70, and more particularly hinge webs 60, 59, 72, and 71 for allowing pivotal movement of the primary arm portions 24, 26 with respect to the rigid non-flexing side portions 18, 20 of the support structure 12. The hinge portions are formed of material of sufficient strength to prevent failure or plastic deformation and to provide infinite life of the support structure 12 under expected design operating loads transmitted through the support structure 12. The hinge portions 58, 70 are sized to maximize the transfer of force from the primary actuator 16 and to assist the pivoting movement of the primary arm portions 24, 26. The force transfer member portion 40 is rigid in order to efficiently transfer work from the primary actuator 16 to the primary pivotal arm portions 24, 26. The force transfer member 40 is rigid in order to prevent any flexure in the rigid portions of the support structure that would result in a decrease in the efficiency of the work transfer.

Referring now to FIG. 3, a top view of the upper secondary portion 28, such as the first clamp portion 30 is illustrated. The opposing surfaces 48, 50 of the first clamp portion 30, and the opposing surfaces 54, 56 of the second clamp portion 34 (shown in FIG. 1B), each can have a shaped recess or enhanced gripping surface 122 formed therein for engaging a movable member 68 (shown in FIGS. 1A and 1B) having a complementary shape or surface. A series of predefined movements of the actuators 16, 46, and 52 can cause the apparatus 10 to move the movable member 68 with respect to the support structure 12. The actuators 16, 46, and 52 can be of any variety known to those skilled in the art, including but are not limited to, piezoelectric actuators and/or magnetostrictive actuators.

The primary force transfer member portion 40 and the primary pivotable arm portions 24, 26 are designed to be substantially rigid component portions. Any flexure of these elements, even microscopic, results in inefficient work transfer due to undesirable motion. In general, the motion of piezoelectric actuator stacks is microscopic, generally approximately 0.1% of the length of the stack. Based on the stacks contemplated for the present invention, such motion would be on the order of 1500 microinches to 100 micro inches maximum displacement depending on the actual embodiment. Therefore, all of the components of the support structure 12 are typically designed to minimize undesirable motion. In extreme, motion greater than 4 microinches would be considered nonrigid and undesirable with respect to the disclosure of the present invention under expected design loads with infinite life for the support structure 12. In actual practice, rigidity is more effectively defined as a ratio of the displacement distance or motion of the side portions, for example 18, 20, toward and away from one another to the displacement distance during free deflection of the force transfer member 40 (i.e. where free deflection is being defined as operating against no load and performing no work). In this context, a displacement distance or motion of the side portions, 18, 20, in excess of 10% of the displacement distance or free deflection of the force transfer member 40 would be considered nonrigid according to the present invention. In practice, this percent is typically much lower. For example, in an embodiment wherein the piezo stack is approximately 0.394 inches long, the percentage of undesirable side portion motion to free deflection is on the order of 2%. Another indication of structural rigidity and resulting performance efficiency is the ratio of the measured free deflection of the arm portions, for example 24, 26, versus the theoretical or calculated values for such motion (i.e. assuming zero loss of motion through a theoretically rigid structure). The minimum efficiency achieved by the present invention using this definition is approximately 80%. Additionally, efficiency as high as approximately 90% has been achieved according to the present invention. It is expected that efficiencies grater than 90% can be achieved with configurations according to the present invention. According to the present invention, all portions of the support structure 12 are considered to be "rigid" except for the hinge portions. The hinge portions are the only components or portions of the support structure where flexure, deflection and movement are desirable. The hinge portions are locations of maximum stress in the support structure 12. The flex points of the hinge portion geometry are precisely selected to optimize performance for a particular use. The design process is supportive of this approach, by adapting the amplifier effect of the hinge portions to meet particular specifications. For example, the hinge portion geometry is specifically designed for maximum performance without stress fatigue failure. By way of example and not limitation, Finite Element Analysis has demonstrated hinge life should be "infinite" within the context of industrial applications. Lab testing of devices using a piezo stack as the primary actuation method combined with the motion amplifier as taught by the present invention have exceeded 500 million operations. The apparatus 10 can be formed of a homogenous material throughout, such as steel, or any suitable material or composite material known to those skilled in the art, as long as the material selected meets the design criteria discussed above for the particular application.

Referring now to FIGS. 5A, 5B and 6, an alternate embodiment of the present invention is shown for moving a movable member, such as a fluid. The fluid can be in either a liquid or a gas phases. The apparatus 10a can be used as a pump for pumping fluid from one location to another, or can be used as a compressor for compressing fluids for use in, by example and not limitation, air conditioning systems, heat pump systems, refrigerator systems, and the like. The apparatus 10a according to the present invention includes a support structure 12a. The support structure 12a includes a primary portion and a secondary portion. The primary portion can include a rigid non-flexing primary web portion 14a, upper and lower primary side portions 18a, 20a, a primary force transfer member portion 40a, and upper and lower primary pivotable arm portions 24a, 26a. The secondary portion of the support structure can include first and second clamps, similar to those illustrated in FIGS. 1A–3, or first and second valve portions 80, 82. Each of the first and second valve portions 80, 82 can include a rigid non-flexing secondary web portion, first and second secondary side portions, a secondary force transfer member, and first and second secondary pivotable arm portions.

The first and second primary sides 18a, 20a extend outwardly from and are integrally connected with the primary web portion 14a. The primary force transfer member portion 40a transmits force from a primary actuator 16a through the first and second primary pivotable arm portions 24a, 26a to move the supported first the second valve portions 80, 82 with respect to one another. The primary actuator 16a moves the first and second valve portions 80, 82 between first and second positions with respect to one another. The opposing faces 42a, 44a move toward one another to the first position when the primary actuator 16a is de-energized, and move away from one another to the second position when the primary actuator 16a is fully energized. A pump means 84, such as a bellows, is located between the opposing faces 42a, 44a of the pivotable arm portions 24a, 26a for movement between an expanded positive displacement pumping chamber position when the primary actuator 16a is energized and a contracted positive displacement pumping chamber position when the primary actuator 16a is de-energized. The expansion and contraction of the positive displacement pumping chamber defines the pumping action of the present invention.

Each valve portion 80, 82 can include first and second secondary side portions 124, 126; 128, 130 extending outwardly from the corresponding secondary web portions 36a, 38a respectively, for supporting secondary pivotable arm portions 62a, 64a; 74a, 76a. Opposing surfaces 42a, 44a, are formed on corresponding arm portions 62a, 64a and opposing surfaces 48a, 50a, are formed on corresponding arm portions 74a, 76a respectively. Secondary actuators 46a, 52a operably engage between corresponding secondary force transfer member portions 86, 94 and the corresponding secondary web portion 36a, 38a. Internally, a standard pneumatic type 2-way valve resides within each valve portion 80, 82 between fittings 92, 100 and the pump means 84. The 2-way valves can be independently opened and closed by an application of voltage to secondary piezoelectric actuators 46a, 52a. The actuators 46a, 52a move the first and second valve portions 80, 82 between a normally closed position when de-energized and an opened position when energized.

Primary hinge portions 58a and 70a are substantially similar to primary hinge portions 58 and 70 of the first embodiment shown in FIGS. 1A and 1B. The primary hinge portions 58a and 70a are generally positioned parallel with respect to one another. The primary hinge portions 58a, 70a, and more particularly hinge webs 254a, 258a extend between the primary force transfer member portion 40a and the primary pivotable arm portions 24a, 26a while hinge webs 60a, 72a extend between the primary side portions 18a, 20a and the primary pivotable arm portions 24a, 26a of the support structure 12a. Each of the secondary portions 28a, 32a can include secondary hinge portions. For purposes of illustration the first secondary portion 28a will be described in detail, when the second secondary portion 32a is identical. The secondary hinge portions 88a, 90a are generally positioned parallel with respect to one another. The secondary hinge portions 88a, 90a and more particularly hinge webs 116a, 120a extend between the secondary force transfer member portion 86 and the secondary pivotable arm portions 62a, 64a, while hinge webs 114a, 118a extend between the secondary side portions 24a, 26a and the secondary pivotable arm portions 62a, 64a of the support structure 12a. Secondary hinge webs 114, 116 and 118, 120 are formed in the secondary portions 28a and 32a respectively, for promoting movement between opposing surfaces 42a, 44a and 48a, 50a. Secondary hinge webs 114, 116 and 118, 120 are formed substantially similar to primary hinge webs 60a, 254a, 72a, 258a.

The primary actuator 16a, and secondary actuators 46a, 52a can be piezoelectric, magnetostrictive, electrostrictive, or other similar types known to those skilled in the art. The fluid ports 92, 100 can be located so that the valve portions 80, 82 are substantially parallel to one another as shown in FIGS. 5A and 5B, or can be substantially orthogonal to one another as shown in FIG. 6, or can be any combination of the two angular orientations of the valve portions 80, 82.

A method of pumping fluid with the present invention can include the steps of closing the second valve 82 while the first valve 80 remains open. Actuating the pump means 84 by energizing the primary actuator 16a moving the first valve portion 80 away from the second valve portion 82 and drawing fluid through the first valve portion 80 into a chamber defined by the pump means 84. After filling the pump means 84, the first valve portion 80 is closed by de-energizing the secondary actuator 46a, and the second valve portion 82 is opened by energizing the secondary actuator 52a. The fluid is expelled from the pump means 84 by de-energizing the primary actuator 16a to contract the chamber defined by the pump means 84 as the first and second primary arm portions 24a, 26a move toward one another forcing the fluid from the pump means 84 through the second valve portion 82 and out the fluid port 100. The fluid flow direction can be reversed by reversing the steps described above. The pump means 84 can include bellows, diaphragms, pistons, positive displacement chambers, variable displacement chambers, and the like.

Figure 7:
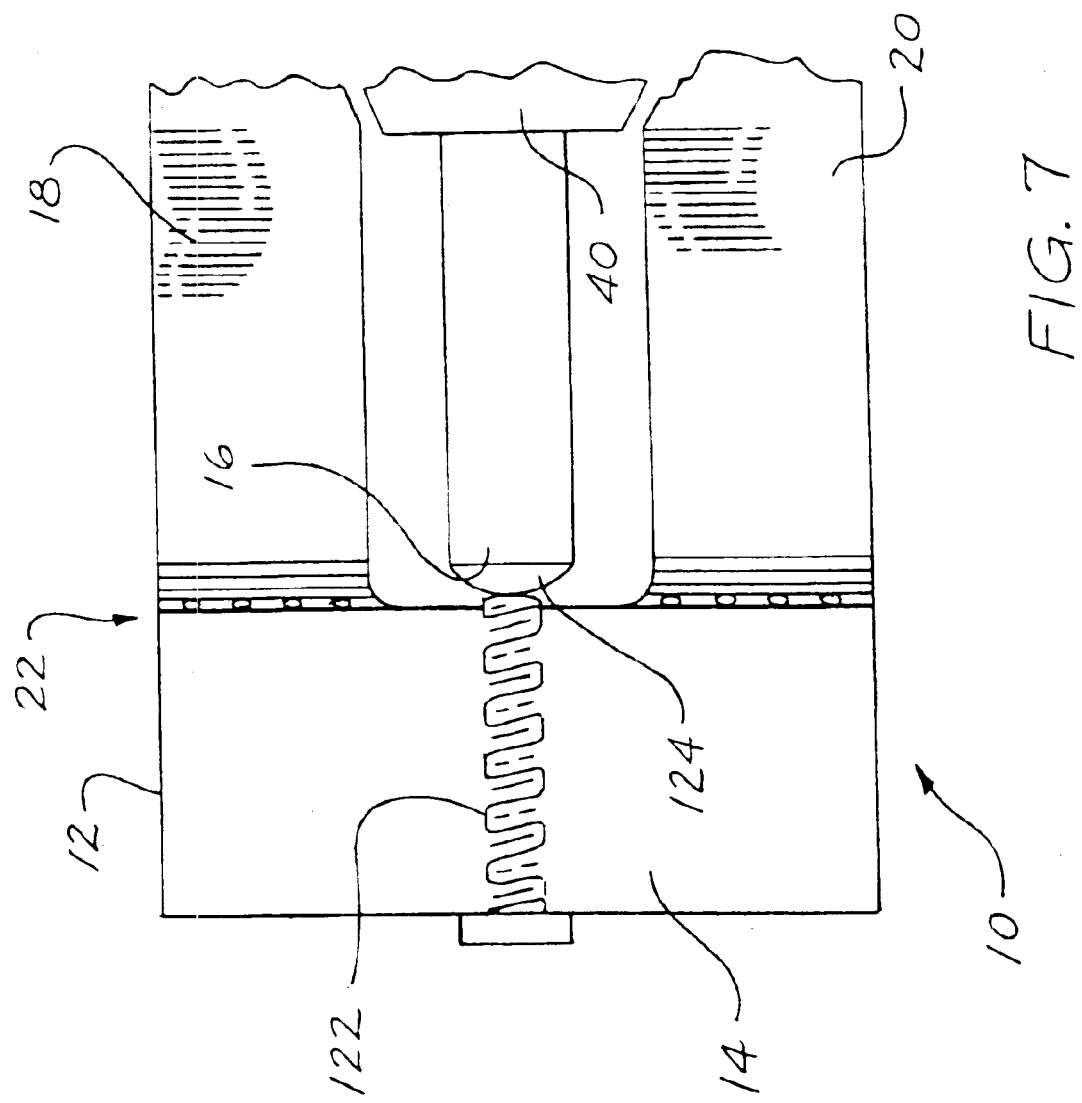
FIG. 7 is a simplified detailed view of means for preloading an actuator according to the present invention with a compressive force.

Referring now to FIG. 7, the apparatus 10 is shown with a screw 122 for supplying a preload compressive force to the actuator 16. The screw 122 is threadingly engagable with the web portion 14 of the support structure 12. A self adjusting seat, or rigid force focusing shim, 124 is operably connected to the screw 122 for self aligning support of the adjacent end of actuator 16. The self adjusting seat 124 generally includes a domed shaped or semi spherical arcuate surface for optimal alignment of the actuator to prevent detrimental shearing forces being applied to the actuator during preloading and energization. It has been found during experimentation with the present invention, that preloading the actuator with a compressive force significantly increases the usable work output from the actuator 16. The work multiplier can be as much as several times over that of an identical actuator 16 that is not preloaded with compressive force prior to being energized. Actuators made of piezoelectric stacks are not very tolerant of being placed under shear force, or side loading. By applying a preload force against the actuator in the de-energized condition, the preload force insures that the stack is always under compression even while the associated structural portion is returning the original position after discharge of the piezoelectric stack. It should be recognized that means for preloading can be provided for any of the configurations disclosed in the present invention, such as to preload actuator 16, 16a, 46, 46a, 52 and/or 52a. In other words, means for preloading the actuator can be provided in either a valve/pump configuration and/or a clamp configuration as disclosed in the present invention.

Figure 8:
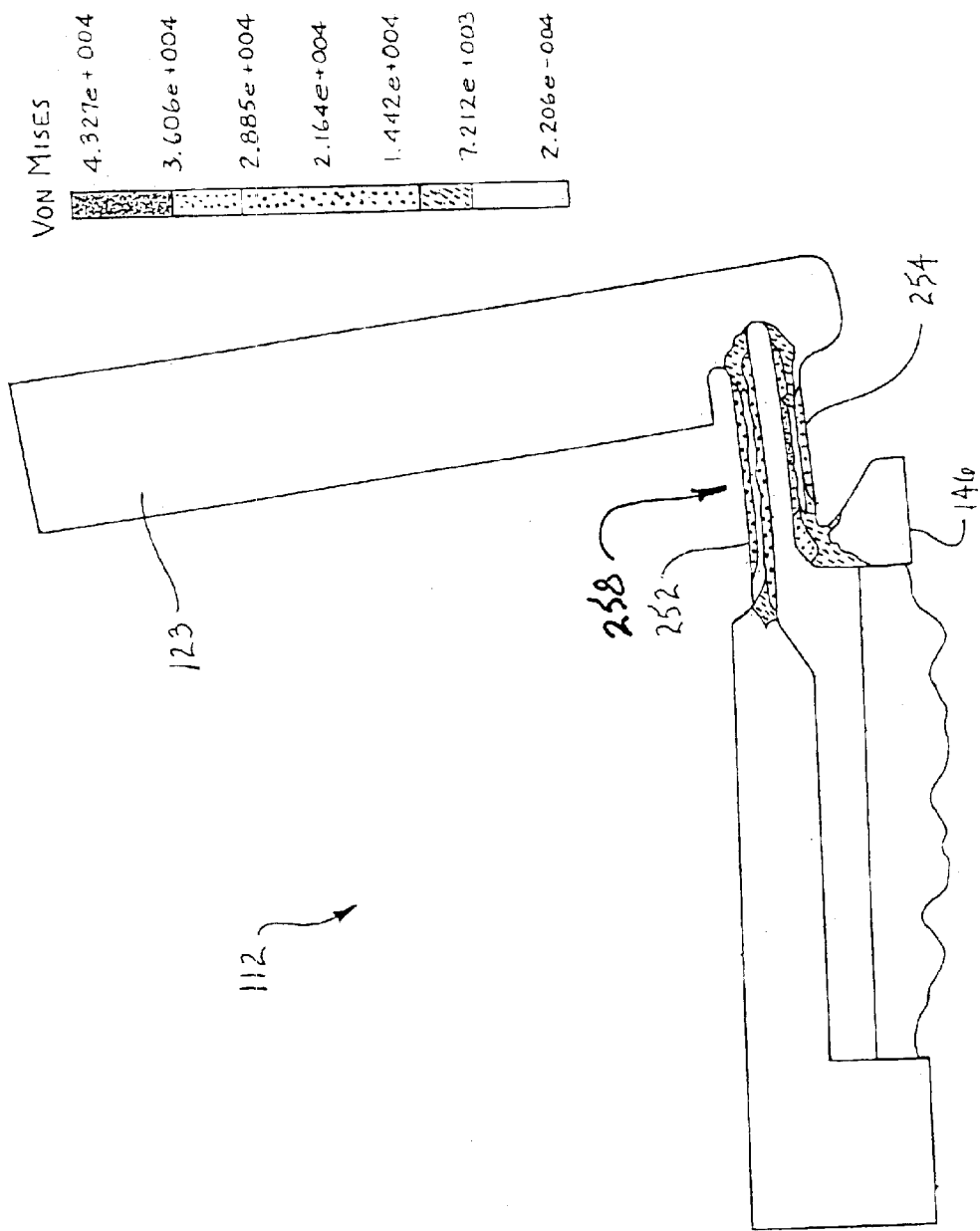
FIG. 8 is a stress plot illustrating the localization of stress in the hinge portion of the apparatus according to the present invention.

Referring now to FIG. 8, results from sample finite element analysis on an apparatus according to the present invention is shown. An actuator (not shown) transmits force through the force transfer member portion 146 of the support structure 112 causing peak stress to be localized in the area of the hinge portion 258 and more particularly in hinge webs 252, 254. The pivotable arm portion 123 is deflected from an original vertical or 90° position under no load to a deflected position as a result of the force transfer member portion 146 imparting force through the hinge portions 258.

Referring to FIGS. 1A–8, a smart material actuator 16, 16a, 46, 46a, 52, 52a such as a piezoelectric actuator, operates so that when electric power is introduced to the actuator, the actuator will change shape proportionally in response to the electric power. The piezoelectric actuator is disposed between opposing surfaces of the support structure 12 and will cause movement of the corresponding structural portion in response to expansion and contraction of the smart material actuator. It should be recognized that a piezoelectric actuator is one possible type of smart material actuator, and other devices, such as magnetostrictive material actuators are also contemplated to be within the scope of the present invention.

The force transfer member portion 40, 40a, 86, 94, 146 the side portions 18, 18a, 20, 20a the pivotable arm portions 24, 26, 24a, 26a, 74a, 76a, 123 and the web portions 14, 36, 38 are designed to be substantially rigid according to the present invention. Any unintended flexure of these portions of the support structure, even microscopic, results in inefficient work transfer due to undesirable motion. The movement of the actuator is microscopic typically on the order of 0.0015 inch to 0.0001 inch maximum displacement. Undesirable flexure movement should not exceed approximately 10% of the ratio of displacement of the side portions, for example 18, 20, to the displacement during free deflection of the force transfer member 40 and the undesirable motion would more typically not exceed approximately 5% to be considered substantially rigid according to how the term is used with respect to the present invention.

The flex points and hinge geometry are precisely selected to optimize performance for a particular application. The design process is supportive of this approach to adapt the "amplifier" effect of the hinges 58, 70, 88, 90, 96, 98 to meet the specifications required for a particular application by maximizing performance without inducing material fatigue. Finite Element Analysis has demonstrated hinge life should be "infinite" within the context of industrial applications. Lab testing of devices using a piezo stack as the primary actuation method combined with the motion amplifier as taught by the present invention have exceeded 500 million operations.

It should be recognized that the present invention can include primary and secondary portions of the support structure configured with a web portion and outwardly extending arm portions as illustrated in FIGS. 1A–3 that can be used for supporting clamp portions or valve portions, and/or can include primary and secondary portions of the support structure configured with a web portion, outwardly extending side portions, a force transfer member portion, and pivotable arm portions as illustrated in FIGS. 5A–6, that can be used for supporting clamp portions or valve portions. In other words, the disclosed support structure can be used in any desired combination for the particular application, pumping or clamping, and the illustrations disclosed above are by way of example and not limitation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus comprising:
    a support structure having first and second arm portions formed thereon for movement relative to one another, and a secondary portion integrally formed on an outer end of each arm portion for movement therewith; and
    a primary actuator operably associated with the support structure for driving the arm portions relative to one another in response to an electrical activation of the primary actuator, and a secondary actuator operably associated with each secondary portion for driving each secondary portion between an opened position and a closed position in response to an electrical activation of the secondary actuator, each of the actuators being operable independently of one another.

2. The apparatus of claim 1 further comprising:
    a rigid non-flexing web portion associated with the support structure.

3. The apparatus of claim 1 further comprising:
    a force transfer member portion for transmitting a force from the primary actuator to move the associated secondary portions between an extended position and a retracted position with respect to one another, the secondary portions moving toward one another to the retracted position when the primary actuator is de-energized and the secondary portions moving away from one another to the extended position when the primary actuator is energized.

4. The apparatus of claim 3 further comprising:
    a rigid non-flexing web portion associated with outwardly extending side portions at opposite ends of the web portion defining a rigid non-flexing C-shaped portion of the support structure; and
    a pair of hinge portions extending generally parallel to one another between the force transfer member portion and each arm portion of the support structure, and between the force transfer member portion and each side portion of the support structure.

5. The apparatus of claim 1, wherein each of the secondary portions further comprises:
    a secondary web portion integrally associated with the corresponding arm portion of the support structure; and
    first and second secondary arm portions integrally associated with and extending from opposite ends of each secondary web portion.

6. The apparatus of claim 5, wherein each of the secondary portions further comprises:
    a force transfer member portion for transmitting a force from the secondary actuator to move the associated secondary arm portions between an opened position and a closed position with respect to one another, the secondary arm portions moving toward one another to the closed position when the secondary actuator is de-energized and the secondary arm portions moving away from one another to the opened position when the secondary actuator is energized.

7. The apparatus of claim 1, wherein each of the secondary portions further comprises a clamp portion.

8. The apparatus of claim 7, wherein each of the secondary portions further comprises opposing surfaces formed on each of the clamp portions with shaped recesses engagable with a movable member having a complementary shape.

9. The apparatus of claim 1, wherein each of the secondary portions further comprises a valve portion.

10. An apparatus comprising:
a support structure having first and second arm portions formed thereon for movement relative to one another, and a secondary portion integrally formed on an outer end of each arm portion for movement therewith, wherein each of the secondary portions further includes a valve portion, the secondary portions defining a first valve portion and a second valve portions;
a primary actuator operably associated with the support structure for driving the arm portions relative to one another in response to an electrical activation of the primary actuator, and a secondary actuator operably associated with each secondary portion for driving each secondary portion between an opened position and a closed position in response to an electrical activation of the secondary actuator, each of the actuators being operable independently of one another; and
an expandable positive displacement pumping chamber positioned between the first and second arm portions of the support structure and in fluid communication with the first valve portion and the second valve portion.

11. The apparatus of claim 1, wherein the primary and secondary actuators can be triggered in different sequential series for bi-directional operation.

12. The apparatus of claim 11, wherein the bi-directional operation is operable to move a movable member in either direction with respect to the support structure.

13. An apparatus comprising:
a support structure having first and second arm portions formed thereon for movement relative to one another, and a secondary portion on an outer end of each arm portion for movement therewith; and
a primary actuator operably associated with the support structure for driving the arm portions relative to one another in response to an electrical activation of the primary actuator, and a secondary actuator operably associated with each secondary portion for driving each secondary portion between an opened position and a closed position in response to an electrical activation of the secondary actuator, each of the actuators being operable independently of one another, wherein the primary and secondary actuators can be triggered in different sequential series for bi-directional operation, wherein the bi-directional operation is operable to pump fluid in either direction with respect to the support structure.

14. The apparatus of claim 1, wherein the actuators are piezoelectric.

15. The apparatus of claim 1, wherein the actuators are magnetostrictive.

16. The apparatus of claim 1 further comprising:
a first and second pair of substantially parallel hinges for the first and second arm portions to pivot about respectively, the first and second pair of hinges formed by at least one reduced area created by slots located in the support structure between each arm portion, and between the force transfer member and the arm portions.

17. The apparatus of claim 1, wherein the support structure is formed of homogenous material.

18. The apparatus of claim 1, wherein the support structure is a uni-body construction.

19. The apparatus of claim 1 further comprising:
means for preloading at least one of the primary and secondary actuators.

20. The apparatus of claim 19 wherein the preloading means further comprises:
a force focusing member operably associated with an end of the at least one of the primary and secondary actuators; and
a screw threadably engagable with a rigid end web of the support structure, the screw operably associated with the force focusing member such that a preload force can be applied to the actuator through the screw and force focusing member prior to energizing the actuator.

21. A method comprising the steps of:
energizing a primary actuator for moving first and second primary pivotable arm portions of a support structure from a first position adjacent one another to a second position spaced apart from one another;
energizing at least one secondary actuator for moving first and second secondary pivotable arm portions integrally formed with the support structure from a first position adjacent one another to a second position spaced apart from one another; and
sequentially energizing and de-energizing the primary and secondary actuators to perform work.

22. The method of claim 21 further comprising the steps of:
opening a fixed clamp responsive to energization of a first secondary actuator, while a normally closed movable clamp remains closed at a start position on a movable member in response to a de-energized second secondary actuator;
moving the movable clamp away from fixed clamp responsive to energization of the primary actuator to carry the movable member to be moved with respect to the fixed clamp;
closing the fixed clamp in response to de-energization of the first secondary actuator;
opening the movable clamp in response to energization of the second secondary actuator; and
moving the movable clamp toward the fixed clamp in response to de-energization of the primary actuator to the start position prior to closing on the movable member.

23. A method comprising the steps of:
energizing a primary actuator for moving first and second primary pivotable arm portions of a support structure from a first position adjacent one another to a second position spaced apart from one another;
energizing at least one secondary actuator for moving first and second secondary pivotable arm portions of the support structure from a first position adjacent one another to a second position spaced apart from one another;
sequentially energizing and de-energizing the primary and secondary actuators to perform work;
opening a first valve responsive to energization of a first secondary actuator, while a normally closed second valve remains closed in response to a de-energized second secondary actuator;
expanding a positive displacement pumping chamber responsive to energization of the primary actuator to draw fluid through the first valve into the chamber;
closing the first valve in response to de-energization of the first secondary actuator;
opening the second valve in response to energization of the second secondary actuator; and contracting the positive displacement pumping chamber in response to de-energization of the primary actuator to force fluid within chamber through the second valve.

24. An apparatus comprising:

a support structure having first and second arm portions movable relative to one another through an actuator-movement-amplification portion, and a secondary portion located on an outer end of each arm portion for movement therewith; and a primary actuator operably associated with actuator-movement-amplification portion of the support structure for driving the arm portions relative to one another in response to an electrical activation of the primary actuator, and a secondary actuator operably associated with each secondary portion for driving each secondary portion between an opened position and a closed position in response to an electrical activation of the secondary actuator, each of the actuators being operable independently of one another.

25. The apparatus of claim 24, wherein the actuator-movement-amplification portion of the support structure further comprises:

a rigid, non-flexing force transfer portion of the support structure located in opposition to an open end of a rigid, non-flexing C-shaped web portion of the support structure for supporting the primary actuator therebetween, and hinge portions connecting the force transfer portion to the arm portions and the C-shaped web portion of the support structure, one pair of hinge portions extending between the force transfer member portion and each arm portion of the support structure, and another pair of hinge portions extending between the force transfer member portion and each side portion of the support structure.

26. The apparatus of claim 24 further comprising:

each secondary portion of the support structure including an actuator-movement-amplification portion.

27. The apparatus of claim 26, wherein the actuator-movement-amplification portion of at least one of the secondary portions of the support structure further comprises:

a rigid, non-flexing force transfer portion of the secondary portion of the support structure located in opposition to an open end of a rigid, non-flexing C-shaped web portion of the secondary portion of the support structure for supporting the corresponding secondary actuator therebetween; and hinge portions connecting the force transfer portion to the arm portions and the C-shaped web portion of the secondary portion of the support structure, one pair of hinge portions extending between the force transfer member portion and each arm portion of the secondary portion of the support structure, and another pair of hinge portions extending between the force transfer member portion and each side portion of the secondary portion of the support structure.

28. An apparatus comprising:

a support structure having first and second arm portions movable relative to one another, and a secondary portion located on an outer end of each arm portion for movement therewith; and a primary actuator operably associated with the support structure for driving the arm portions relative to one another in response to an electrical activation of the primary actuator, and a secondary actuator operably associated with each secondary portion for driving each secondary portion between an opened position and a closed position through an actuator-movement-amplification portion in response to an electrical activation of the secondary actuator, each of the actuators being operable independently of one another.

29. The apparatus of claim 28, wherein the actuator-movement-amplification portion of the support structure further comprises:

a rigid, non-flexing force transfer portion of the secondary portion of the support structure located in opposition to an open end of a rigid, non-flexing C-shaped web portion of the secondary portion of the support structure for supporting the corresponding secondary actuator therebetween; and hinge portions connecting the force transfer portion to the arm portions and the C-shaped web portion of the secondary portion of the support structure, one pair of hinge portions extending between the force transfer member portion and each arm portion of the secondary portion of the support structure, and another pair of hinge portions extending between the force transfer member portion and each side portion of the secondary portion of the support structure.

30. An apparatus comprising:

a support structure having first and second arm portions movable relative to one another, and a secondary portion located on an outer end of each arm portion for movement therewith; and a primary actuator operably associated with the support structure for driving the arm portions relative to one another in response to an electrical activation of the primary actuator, and a secondary actuator operably associated with each secondary portion for driving each secondary portion between an opened position and a closed position in response to an electrical activation of the secondary actuator, each of the actuators being operable independently of one another, wherein at least one of the primary and secondary actuators operates through an actuator-movement-amplification portion of the support structure.

31. The apparatus of claim 30, wherein the at least one actuator-movement-amplification portion of the support structure further comprises:

a rigid, non-flexing force transfer portion located in opposition to an open end of a rigid, non-flexing C-shaped web portion for supporting the corresponding actuator therebetween; and hinge portions connecting the force transfer portion to the arm portions and the C-shaped web portion, one pair of hinge portions extending between the force transfer member portion and each arm portion, and another pair of hinge portions extending between the force transfer member portion and each side portion.

* * * * *